United States Patent
Suzaki (10) Patent No.: US 7,240,239 B2
(45) Date of Patent: Jul. 3, 2007

(54) INPUT AND OUTPUT CONTROL MEANS FOR COMPUTER SYSTEM STORAGE AND A SOFTWARE EXECUTION METHOD USING SAME

(75) Inventor: Kuniyasu Suzaki, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 838 days.

(21) Appl. No.: 10/101,097

(22) Filed: Mar. 20, 2002

(65) Prior Publication Data

US 2004/0078636 A1    Apr. 22, 2004

(51) Int. Cl.
 *G06F 11/00* (2006.01)
(52) U.S. Cl. .............................. 714/15; 714/6; 714/13; 714/18
(58) Field of Classification Search ............... 714/6, 714/13, 15–18; 718/100, 1; 711/143; 713/158
See application file for complete search history.

(56) References Cited

U.S. PATENT DOCUMENTS

| | | | | |
|---|---|---|---|---|
| 5,999,723 | A * | 12/1999 | Nachenberg | 703/22 |
| 6,233,702 | B1 * | 5/2001 | Horst et al. | 714/48 |
| 6,795,966 | B1 * | 9/2004 | Lim et al. | 718/1 |
| 2003/0056143 | A1 * | 3/2003 | Prabhu | 714/13 |
| 2003/0101381 | A1 * | 5/2003 | Mateev et al. | 714/38 |
| 2003/0135791 | A1 * | 7/2003 | Natvig | 714/38 |

OTHER PUBLICATIONS

Kuniyasu Suzaki, "Network Transferable Computer", http://staff.aist.go.jp/k.suzakl/English/NTC/index.html. National Institute of Advanced Industrial Science and Technology, Nov. 10-16, 2001 (English translation provided).
Kuniyasu Suzaki, "Checkpoint For Network Transferable Computer", http://www.etl.go.jp/~suzaki/NTC, National Institute of Advanced Industrial Science and Technology, Institute of Information Processing, Seminar of System Software and Operating System, Jul. 26, 2001 (Abstract).

* cited by examiner

*Primary Examiner*—Scott Baderman
*Assistant Examiner*—Timothy M. Bonura
(74) *Attorney, Agent, or Firm*—Oblon, Spivak, McClelland, Maier & Neustadt, P.C.

(57) ABSTRACT

The present invention provides an input and output device for computer system storage that can prevent a computer system being fatally damaged by a computer virus, and also provides a software execution method that by using the input and output device, enables trial software, trial data and mail data to be safely tried. For this, a virtual computer system is used that runs on a computer system. Writes to a hard disk in the virtual computer system are made via a disk cache, and whether or not data is transferred from the disk cache to the hard disk is controlled. Application program snapshot data created by the computer system is recorded on a recording medium that is substantially read-only or transmitted to a different computer system. The snapshot data from the recording medium is read or received by the different computer system and a processing by the application program is resumed in the state in which data transfer from the disk cache to the first storage has stopped.

3 Claims, 7 Drawing Sheets

INPUT AND OUTPUT CONTROL MEANS FOR COMPUTER SYSTEM STORAGE AND A SOFTWARE EXECUTION METHOD USING SAME

BACKGROUND OF THE INVENTION

1. Field of the Invention

The present invention relates to an input and output means for computer system storage and a software execution method using same, for preventing a computer system being fatally damaged by a computer virus that becomes a problem when providing new software for trial.

2. Description of the Prior Art

Trial software and trial data are exchanged via various communication media, and there are cases in which computer systems are damaged by computer viruses that become attached accompanying trial software and trial data distributed via the Internet in particular. Such damage can alter an operating system (OS) and, if it continues after such an alteration, in most cases it becomes necessary to reinstall the OS on the computer system, canceling the intended computer processing.

Generally, to prevent such damage, trial software is tried out, or characteristics of files created by a virus produced by reading trial data or mail data are detected and the file removed, or files that have a computer virus are erased before trying out trial software or reading trial data or mail data. Because new viruses are distributed one after another, it is difficult to prevent damage at the start of distribution using computer virus removal software.

In the case of such damage produced by a computer virus, there are known computer systems that substantially eliminate this kind of damage caused by computer viruses by using a function provided to reset the computer system before trying out trial software, or reading trial data or mail data.

Connectix Corporation's Virtual PC, for example, uses a method in which trial software and the like is operated on a virtual system using another, second, disk image file of the initial disk image file. Here, during operation, Virtual PC performs processing using the second disk image file, but when shutting down Virtual PC, when required, a procedure is used to have the second disk image file record reflected in the initial disk image file. Therefore, if a computer virus causes damage during the operation of Virtual PC, it is possible to return to the initial state by discarding the second disk image file.

Figure 1:
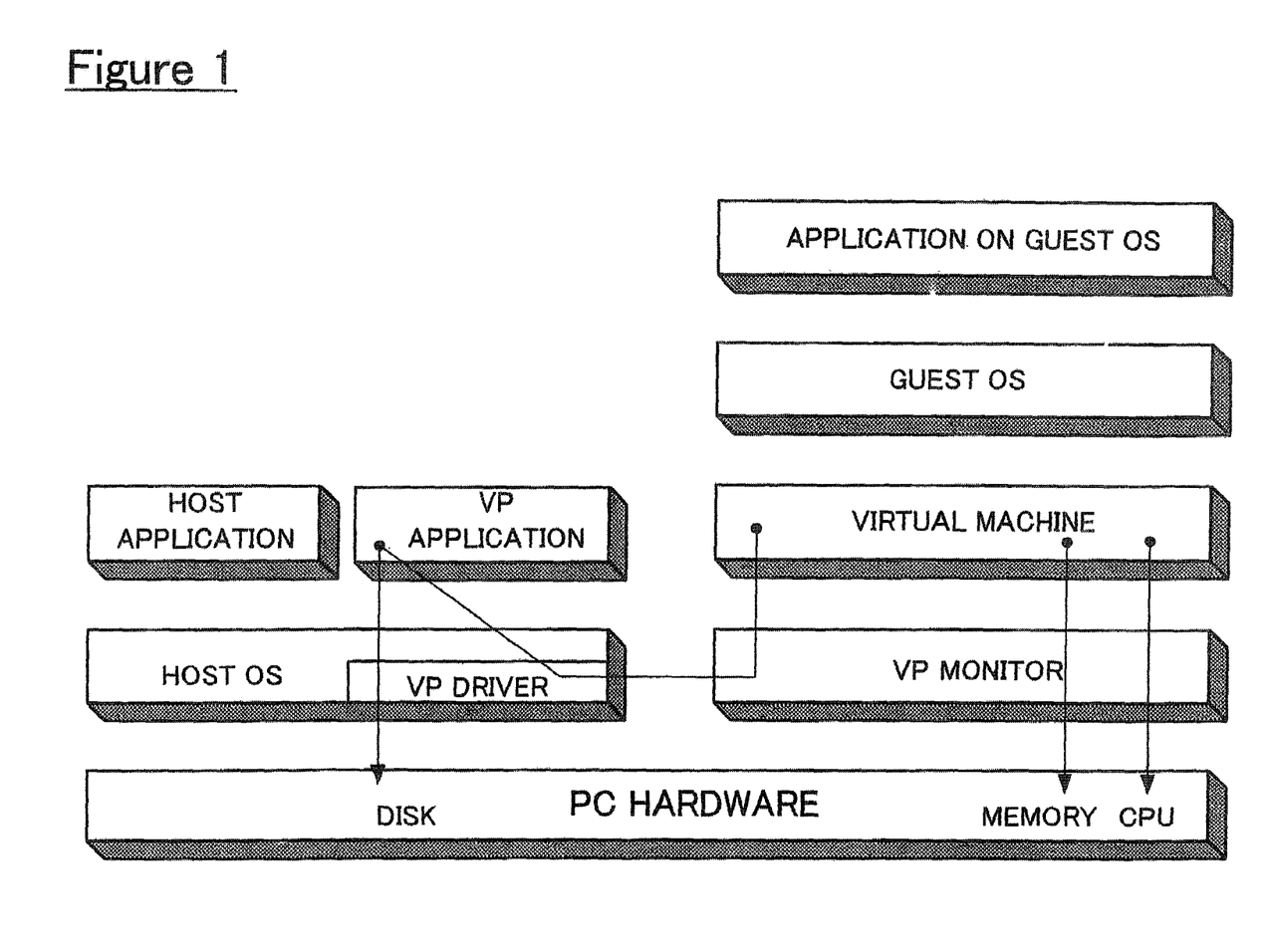
FIG. 1 is a block diagram showing a platform architecture in a conventional virtual computer.

As shown by the block diagram of FIG. 1, with VMware, Inc.'s VMware, the guest OS does not directly access the hard disk, but performs reads and writes via a virtual disk provided by VMware. FIG. 1 shows a host application operating on a host OS, a virtual platform (VP) application operating on a host OS, and a guest OS application operating on a guest OS. Thus, an application-operating environment can have a plurality of modes. Also, hard-disk read/write operations are carried out via a VP application; the following three read/write modes are available.

(1) Persistent mode: This mode performs hard-disk reads and writes in real time, as in the case of an ordinary hard disk.

(2) Non-persistent mode: A history of changes is written not to the hard disk but to a redo log, and the redo log is discarded when the guest OS terminates, so ultimately the hard disk is not written to.

(3) Undoable mode

Similarly to the case as in the above-mentioned non-persistent mode, a change history is written to the redo log and the contents of changes are saved, and when the guest OS is being terminated it is possible to choose to commit the contents of the redo log to the hard disk, discard the redo log, or to keep the contents instead of discarding the redo log.

In this way, computer systems up to the present use a disk image file to carry out a processing and, if required, the disk image file has been stored on the hard disk of the computer system. The examples described above provide a mode in which there is no direct writing to the hard disk, but to realize this mode, intermediate code, intermediate data and other such interim data-processing states are saved on the hard disk as required. This saving to the hard disk is undesirable from the standpoint of security and makes it more possible to create a computer virus.

As is well known, a computer virus causes damage by rewriting system files stored on the hard disk and erasing or modifying data files. This being the case, a computer system that is saved on a hard disk, such as described above, is more susceptible to damage caused by a computer virus.

The present invention is proposed in view of the above situation, and has as one object to provide an input and output means for computer system storage that by having a configuration that can stop a hard-disk write capability when endeavoring to prevent damage caused by a computer virus, but can enable a hard-disk write capability in cases such as when large-scale data processing is performed, is able to prevent a computer virus from fatally damaging a computer system while minimizing any loss of convenience. Another object is to provide a software execution method using the above input and output means for computer system storage that, by using the input and output means for computer system storage, enables trial software, trial data and mail data to be safely tried.

SUMMARY OF THE INVENTION

To attain the above objects, the present invention provides an input and output means for computer system storage, comprising a computer equipped with a first storage, a second storage that with respect to access speed operates at a higher speed than the first storage, and a processor; and a virtual computer operating on the computer and equipped with a configuration that, when writing to the first storage, writes via a disk cache of a predetermined capacity, and a switch that controls whether or not data is transferred from the disk cache to the first storage.

The present invention further provides a software execution method using a second computer system equipped with the above input and output means to resume a processing from a snapshot of a processing by a predetermined application program saved by a first computer system, comprising a step of transmitting snapshot data created by the first computer system to the second computer system; a step of receiving the snapshot data in the second computer system; and a step of resuming the processing by the application program in the second computer system in a state in which data transfer from the disk cache to the first storage has stopped.

The present invention further provides a software execution method using a second computer system equipped with the above input and output means to resume a processing from a snapshot of a processing by a predetermined application program saved by a first computer system, comprising a step of recording snapshot data created by the first computer system onto a recording medium that is substantially read-only; a step of using the second computer system to read the snapshot data from the recording medium; and a step of resuming the processing by the application program in the second computer system in a state in which data transfer from the disk cache to the first storage has stopped.

Further features of the invention, its nature and various advantages will be made apparent from the accompanying drawings and following detailed description of the invention.

DESCRIPTION OF THE PREFERRED EMBODIMENT

In the following description, a computer is hardware equipped with at least a processor (for example, a microprocessor unit: MPU), a first storage (for example, a hard disk: HDD) and a second storage that is faster than the first storage (for example, semiconductor memory: RAM), and a computer system is a computer that operates an OS on that hardware. Also, a virtual computer denotes a hardware function emulator running on the above computer system, and a virtual computer system refers to a computer running a predetermined OS on the hardware function emulator.

Figure 2:
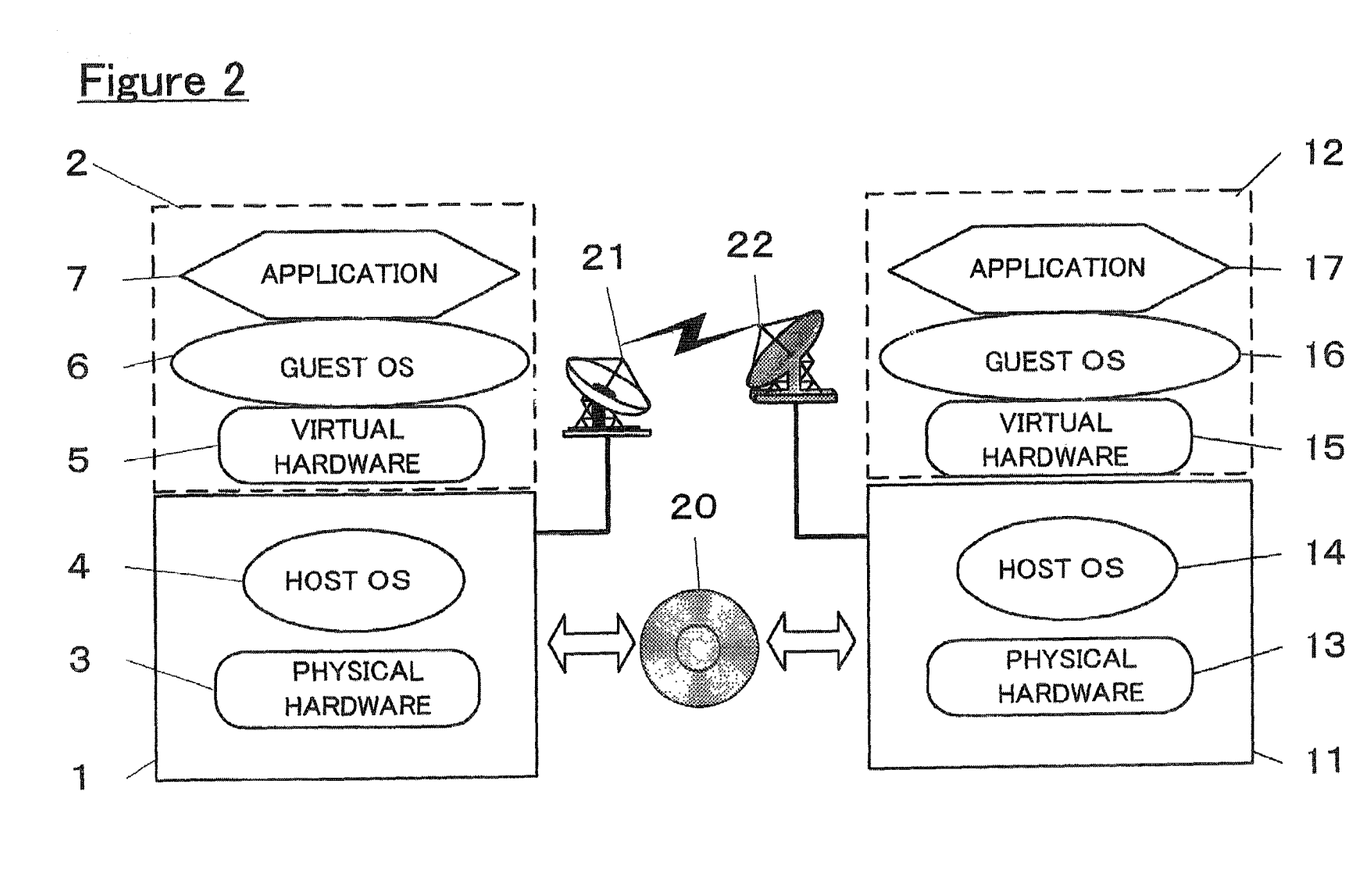
FIG. 2 is a schematic diagram of a configuration comprising two computer systems positioned apart, showing when processing being executed on one computer system by an application program is suspended and transferred to the other computer system where the processing continues.

As a simple example, a case of two computer systems 1 and 11, positioned apart on which virtual computer systems 2 and 12, respectively, are running, as shown in FIG. 2, will be considered. The computer systems 1 and 11 each use a hard disk (HDD) as a first storage, semiconductor memory (RAM) as a second storage, and a microprocessor unit (MPU) as a processor. First, a case will be explained in which processing being executed on virtual computer system 2 by an application program is suspended and transferred by CD-ROM 20 to the computer system 11 and the processing is continued by virtual computer system 12. Reference numerals 21 and 22 in FIG. 2 denote communication antennas.

Two computer systems 1 and 11 are shown in FIG. 2. Computer system 1 is, for example, hardware 3 that is a desktop PC on which host OS 4 is loaded. Virtual hardware (also called a virtual computer) 5 is configured on the host OS 4, guest OS 6 runs on the virtual hardware 5, and an application 7 on the guest OS 6 carries out logical operations. The other computer system 11 is, for example, hardware 13 that is a notebook PC on which host OS 14 is loaded. Virtual hardware (virtual computer) 15 is configured on the host OS 14, and guest OS 16 runs on the virtual hardware 15. These two computer systems form a configuration in which CD-ROM 20 is used to transfer data.

As shown in FIG. 2, during execution of application 7 controlled by guest OS 6 being run by virtual hardware (virtual computer) 5, an already well-known BIOS-independent hibernation is executed. In the course of this, a snapshot of the memory contents and device settings is saved on the hard disk and the guest OS stops. Next, the host OS 4 records on the CD-ROM a virtual hard disk (that to the host OS is a kind of file) that includes a snapshot of the guest OS.

This is received by the host OS 14 on the read-out side and the virtual hard disk including the snapshot is used to start the virtual hardware 15. When this is happening, the path by which data is transferred from the disk cache of the computer system 11 to the HDD is interrupted so that the guest OS 16 cannot access the HDD. Next, when a snapshot is found during the guest OS 16 boot process, the contents thereof are expanded in memory, device settings returned and processing is resumed by the guest OS 16 on the receiving side, and the application 17 controlled thereby. When it is known that the data recorded on the CD-ROM is safe, the path via which data is transferred from the disk cache of the computer system 11 to the HDD is established and operations performed using the HDD.

By doing this, looked at from the viewpoint of the application program executed by the guest OS, hardware changes have no effect. Also, in cases where the data transfer path from the disk cache to the HDD is interrupted, the HDD cannot be accessed, so even if the data on the CD-ROM includes a computer virus, essentially the computer system 11 receives no damage.

The above interruption of the data transfer path from the disk cache to the HDD is done as follows.

A disk cache is a memory (usually a semiconductor memory) that is faster than the hard disk, that is used to hold data to enable hard disk data to be rewritten at high speed, for effecting high-speed access in cases where the same data is accessed a number of times, and for collectively writing to disk with an intentional delay. In the present invention, disk writes are controlled using an operation that corresponds to extending this delay without limit. Data is usually written to the HDD by the write-back method. Disk cache data is usually written to the HDD at set intervals, or is collectively written to the HDD when the ratio of the disk cache rewritten portion becomes high. In this invention, the data transfer path from the disk cache to the hard disk is provided with a switch to control the flow of data, controlling whether or not there are hard-disk rewrites.

Here, if sufficient disk cache capacity cannot be ensured it gives rise to the problem of the disk cache being unable to accommodate the data, so it is desirable to allocate as large a memory amount as possible to the disk cache. Also, if the disk cache cannot hold the data, the OS itself will stop, but it is possible to obtain some findings with respect to whether or not trial software, trial data or mail data is safe. Also, the time it takes for the OS itself to stop depends on the quantity of rewrite data, which differs depending on disk cache capacity and application, so in some cases it is possible to adjust, depending on the size of the memory region allocated to the virtual computer and the application data updates.

Next, details of modes of the embodiment of the invention will be described. As one preferred example, a hardware configuration will be described that uses Linux as the OS.

Figure 3:
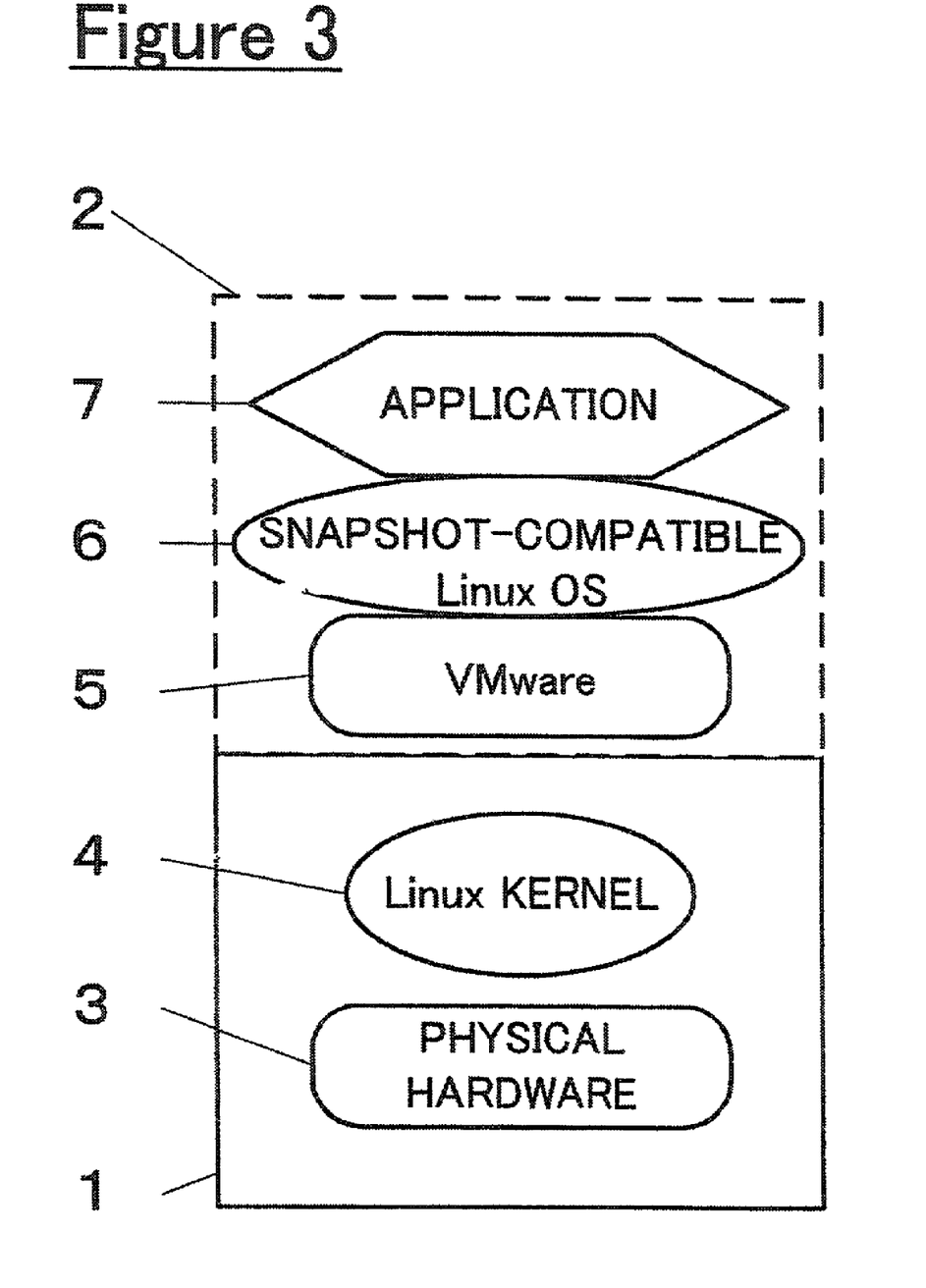
FIG. 3 is a schematic diagram showing a computer system in which Linux is used as the host OS, the well-known virtual computer simulation software VMware 2.0.3 is used as virtual hardware, and Linux on VMware is used as the guest OS.
Figure 4:
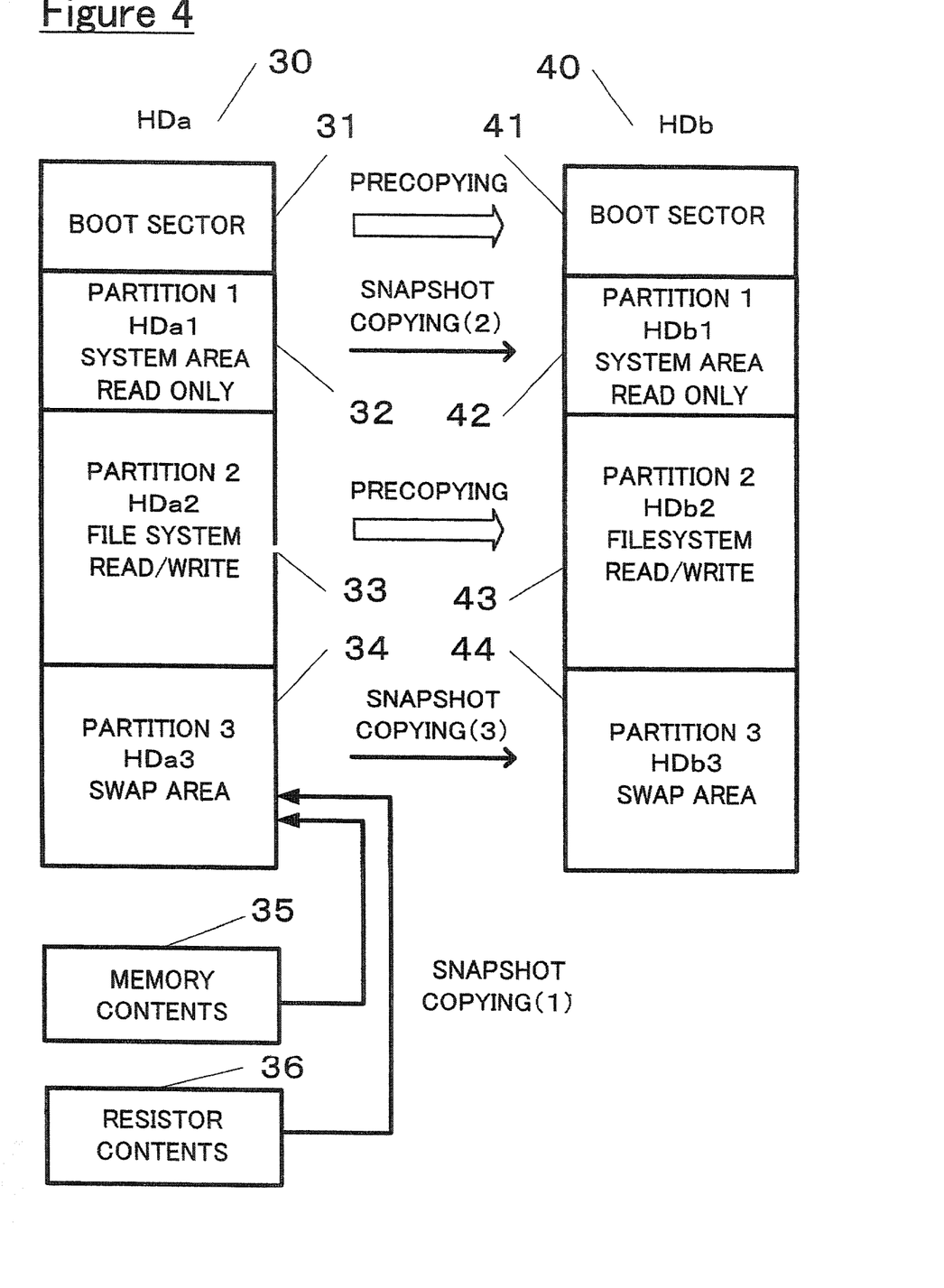
FIG. 4 is a schematic diagram showing a hard-disk partition configuration.

The system shown in FIG. 3 is a computer system in which Linux is used as the host OS, the well-known virtual computer simulation software VMware 2.0.3 is used as virtual hardware 5, and Linux running on VMware is used as the guest OS 6. This system also runs a snapshot-compatible Linux OS as the target OS on the VMware, with two virtual hard disks being set as the IDE hard-disk emulation at that time, comprising a master (HDa) and a slave (HDb) connected to a primary controller. FIG. 4 is a schematic diagram showing the hard-disk partition configuration. By means of this configuration, a file retaining the system state can be utilized in the same way on almost all the computers, and it is also possible to start from exactly the same state on a plurality of computers.

Figure 6:
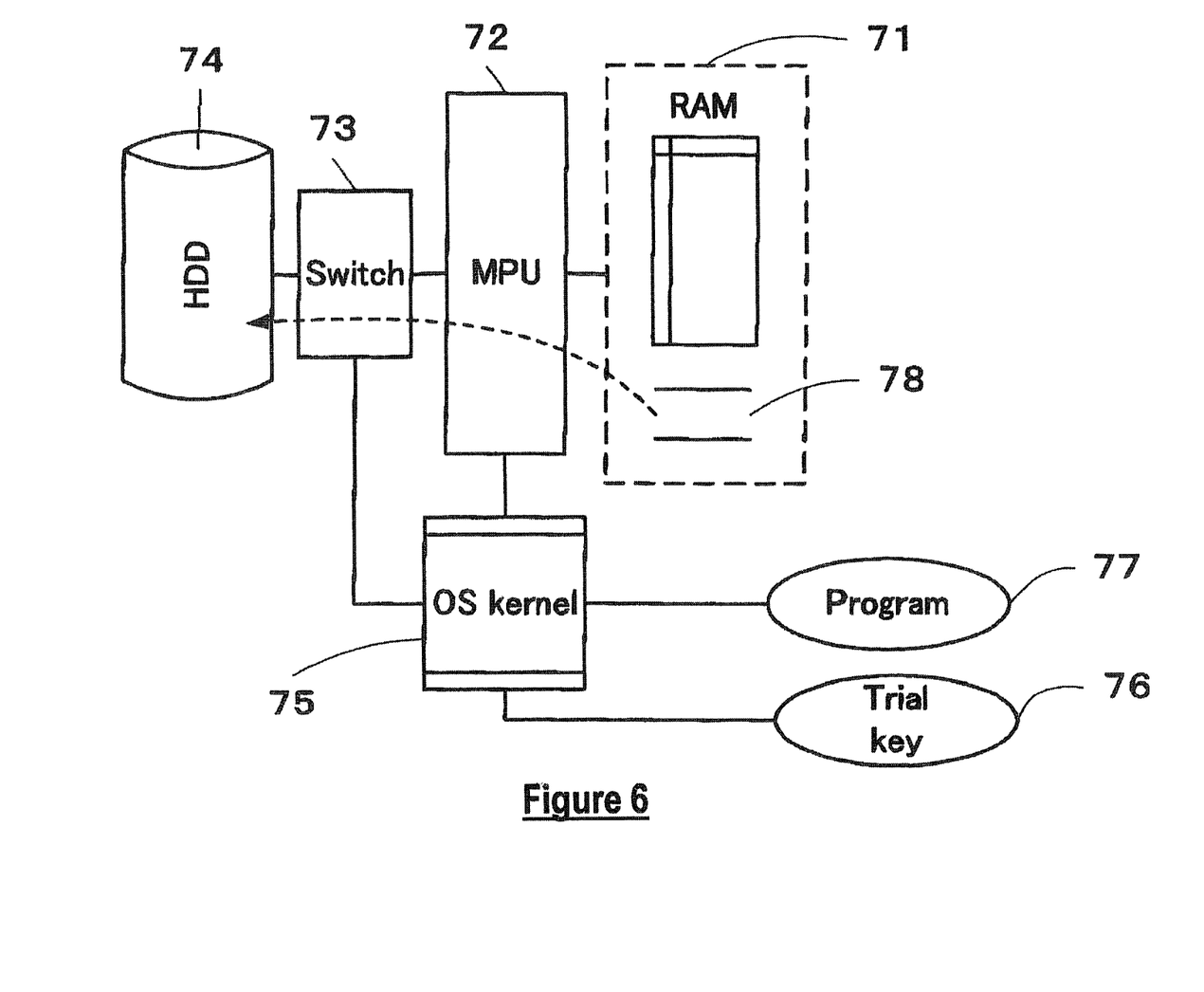
FIG. 6 is a schematic diagram showing an input and output means for computer system storage.

When data is recorded on HDD 74 in accordance with a request from OS kernel 75 or the like, as shown in FIG. 6, using the write-back method, data in a disk cache 78 provided in RAM is recorded via MPU 72. A switch 73 is provided between the MPU 72 and the HDD 74 that controls whether or not data flows therebetween. Hereinbelow, this switch is termed a write-back switch. This write-back switch can be configured as a hardware switch or it can be configured as a software switch. The MPU 72 and write-back switch 73 are controlled by OS kernel 75. The OS kernel 75 operates in accordance with requests from program 77 and trial settings 76.

In the course of this, with respect to control of these switches, it is desirable to provide monitoring means to monitor whether or not control was done by a computer virus.

Figure 7:
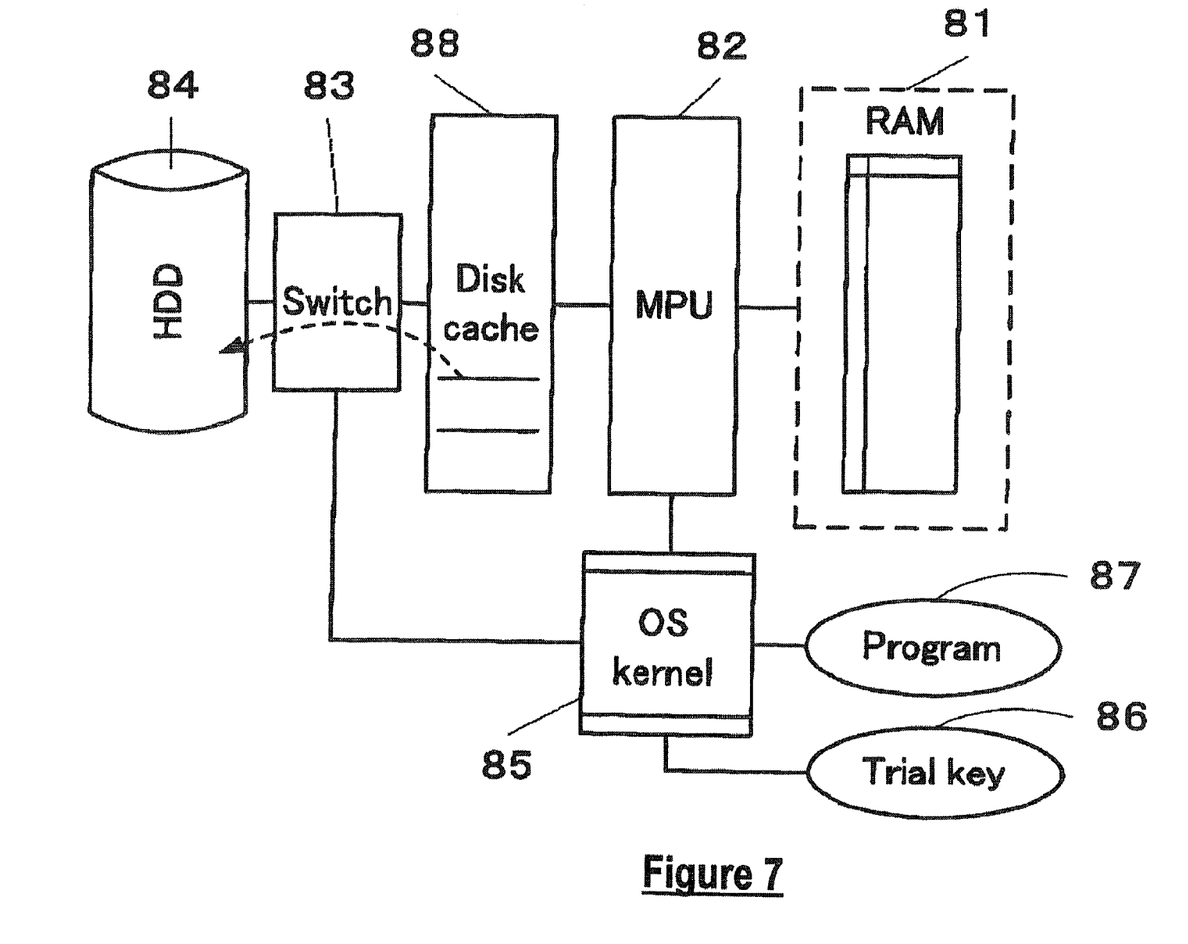
FIG. 7 is a schematic diagram showing another input and output means for computer system storage.

With the above configuration, disk cache 78 data is recorded via the MPU 72, by the write-back method. However, the disk cache does not have to be provided in RAM 81 and can instead be provided affixed to the HDD, as shown in FIG. 7. In the computer system shown in FIG. 7, disk cache 88 is provided between MPU 82 and HDD 84, and write-back switch 83 is provided between the disk cache 88 and the HDD 84. The MPU 82 and write-back switch 83 are controlled by OS kernel 85. The OS kernel 85 operates in accordance with requests from program 87 and trial settings 86.

Next, operation of the system will be explained, using FIG. 4. In this system, HDa1 32 is utilized as the root file system and HDa2 33 as the /var file system. The root file system is mounted with a read-only attribute, and Hda3 34 is utilized as a swap area. Denoted by reference numeral 31 is a boot sector, by 35 are memory contents and by 36 are resistor contents.

HDb 40 uses exactly the same partition configuration as HDa 30. That is, exactly the same number of partitions (boot sector 41, HDb1 42, HDb2 43 and HDb3 44) and partition sizes are used. The root file system and boot sector are copied as images to the corresponding partition beforehand.

In this state, a snapshot-compatible Linux OS is operated, using HDa1, HDa2, HDa3. The snapshot function performs the following operations when directed to take a snapshot.
1) Processes and data in memory are output to the swap area.
2) A swap partition and a /var partition are each copied to the corresponding partition in HDb.
3) Memory that was used for working and the swap are released, and the system resumes from the state prior to the snapshot.

Thus, the system state is retained in HDb. Since the root utilizing the fact that the contents do not change, a copy is not made at the snapshot point. This is for speeding up snapshots.

Under the VMware environment, virtual hard disks HDa and HDb exist as single files within the host OS, enabling the file corresponding to HDb to be utilized as the snapshot system state. Also, with respect to copying read-only partitions (in the above example, only the root file system in HDa1) and boot sectors prior to system startup, this can be readily done by copying the one corresponding file on the hard disk under the host OS.

Read-only can be effected by having the disk cache write-back switch on when the snapshot program is taking a snapshot and, from the next boot, not performing write-back. Or, the disk cache write-back switch can be switched on during the boot, and write-back not performed in boots from snapshots that have been made read-only.

First, checkpoint software used to take a snapshot without stopping OS execution will be outlined. The software used was SWSUSP (SoftWare SUSPend) with the following enhancements.
(1) A new hard-disk copy is prepared. The contents of the existing hard disk are copied to this hard disk.
(2) A /etc/checkpoint.conf file is prepared and the snapshot disk partition designated.
(3) The shutdown command, Linux kernel source code are enhanced as follows. The shutdown command flags were increased to one flag (¯x) more than SWSUSP. In accordance with the ¯x flag, the OS reads the content of /etc/checkpoint.conf and, via a reboot system call, passes the content and a new command to the kernel. The sequence of this process is shown in the FIG. 5 flow chart.

A system for taking a snapshot comprises a) a Linux kernel and b) a utility (shutdown command). The utility triggers a snapshot operation request to the Linux kernel. The actual snapshot operation is achieved by means of the Linux kernel.

The snapshot operation will be explained using the flow chart of FIG. 5.
1) Step 51: The operation is started by a shutdown command.
2) Step 52: The shutdown command reads /etc/checkpoint-.conf.
3) Step 53: The shutdown command issues a reboot system call.
5) Step 63: The Linux kernel initiates suspension.
6) User processes are suspended and contents of registers and real memory are saved to an empty swap area.
7) Step 66: The necessary partitions including swap partitions (designated by checkpoint.conf) are copied.
8) Step 54: Resume or power-off is performed depending on the operating mode.

Reference numeral 50 denotes a user space and reference numeral 60 indicates Kernel Space. It is determined at 55 whether continuation of OS or a user process is to be executed. At 61 it is determined whether or not the shutdown request is normal. The ordinary SWSUSP process is closed at 65.

Also, the shutdown command is based on a Software Suspend patch at sysvinit-2.76; when the shutdown command is started by a flag requesting a suspend or checkpoint operation, the next operations are performed.
1) /etc/checkpoint.conf is read.
2) A reboot system call is issued.

The reboot system call argument is, for example, as follows.
reboot(magic1, magic2, cmd, arg);
magic1: magic number for example 0xfee1dead magic2: magic number for example 672274793 cmd: command
    0xD000FCE2: Do suspend operation (1)
    0x19940107: Do checkpoint operation.
    0x19950906: Do suspend operation (2).
    Other commands are the same as those of the original Linux.
arg: command argument
    With the snapshot function, is used to designate the partitions that are copied.
    Designate the following address: struct checkpoint$_{13}$copy$_{13}$ list.

Figure 5:
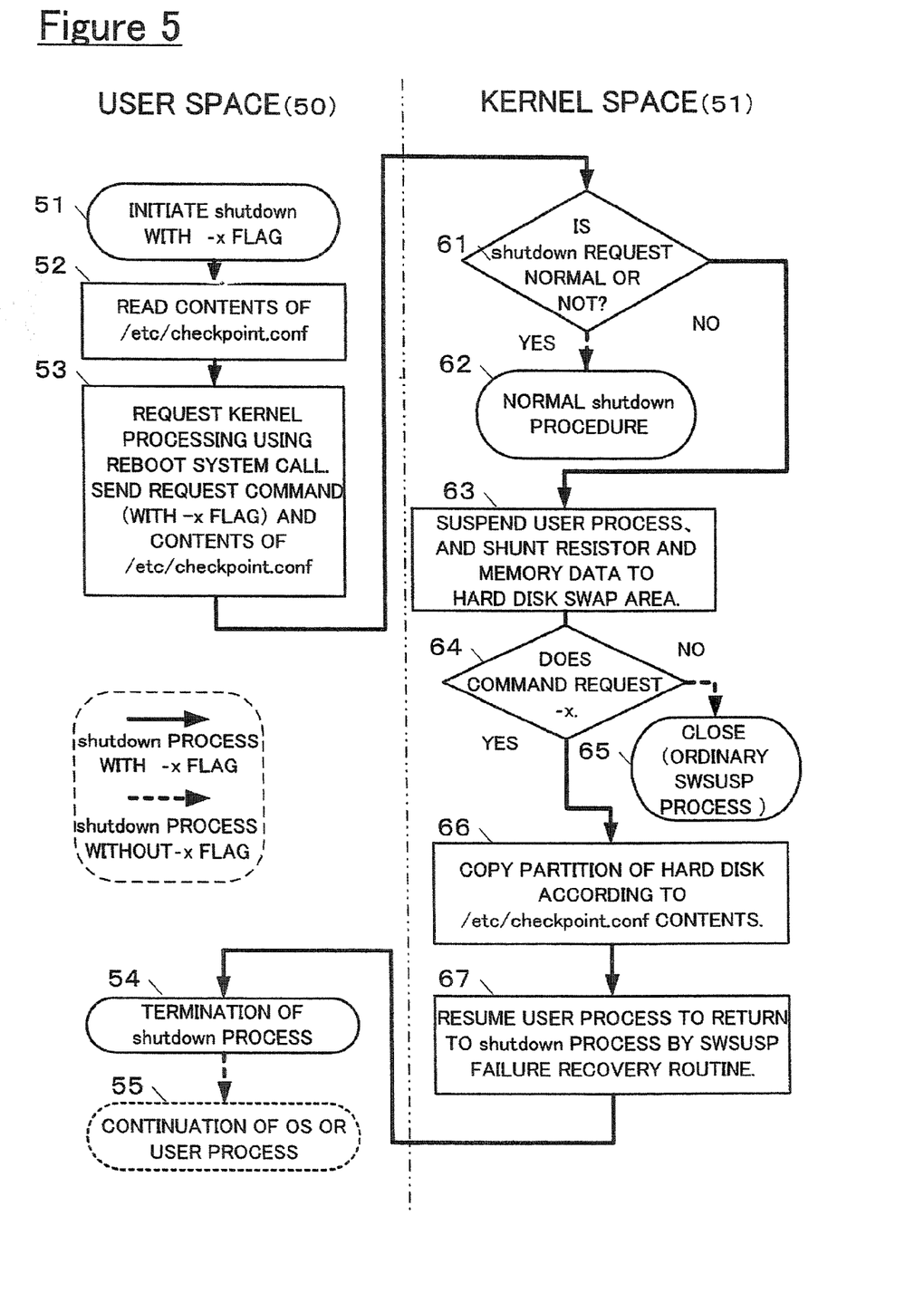
FIG. 5 is a flow chart showing the operation of checkpoint software that takes a snapshot without halting OS execution.

The above suspend operations (1) and (2) correspond to the normal shutdown procedure shown in step 62 of FIG. 5. The suspend operation (1) disconnects the power supply without performing the copying designated by arg, leaving information for the resuming in the swap. The suspend operation (2) performs the copying designated by arg and disconnects the power supply without leaving information for the resuming in the swap.

struct checkpoint_copy_list {int count;struct checkpoint-
    _copy_pair_list[0];};
count: Designation of array length designated in list.
list: array of paired copy source and copy destination.
struct checkpoint_copy_pair {char from[CP_PATH-
    _LENGTH];char to[CP_PATH_LENGTH];};
from: Designation of copy source device file.
to: Designation of copy destination file.

Step 64 and subsequent steps are processed as follows. The shutdown command reads /etc/checkpoint.conf, produces a checkpoint_copy list and issues a reboot system call. In the case of this example, Table 1 below shows the relationship between this shutdown flag and the reboot system call command.

TABLE 1

| Flag | Command |
|------|---------|
| ¯x   | Checkpoint operation |
| ¯z   | Suspend operation (1) |

When a snapshot operation is requested by a reboot system call in step 66, the Linux kernel performs the following operations.
1) Designated operating mode information and partition information of the partition to be copied are saved in internal variables.
2) The snapshot operation enters a queue in the kernel and waits for the snapshot operation to be enabled.
3) User processes are suspended and contents of registers and all memory are copied to a swap.
4) From step 67 onward, processing is performed in the following order, although the following operations differ depending on the operating mode.
a) Copying is done in the order according to the copy partition information. Routines that process the copy open, read, write and close system calls are called directly and used. The corresponding function is save_disk_image ( ) of kernel/swsusp.c.
b) Swap areas used to copy contents of registers and all memory are released. The corresponding function is cleanup_unused_swap_pages ( ) of kernel/swsusp.c.
c) Buffers that were used for working are released. While this is not essential since they free up automatically even if they are left as they are, they are released here because there is little likelihood that used buffers will be re-utilized. The corresponding function is free_unuse_buffer ( ) of kernel/swsups.c.
d) The power supply is disconnected. If the power supply is not turned off, a return to normal operation is possible by using the same routines used to recover from a suspend failure. Whether these processes are implemented or not depends on the operating mode. Table 2 below shows which processes are implemented in the following operating modes.

TABLE 2

| Mode | a) | b) | c) | d) |
|------|-----|-----|-----|--------|
| Checkpoint | Yes | Yes | Yes | Recover |
| Suspend (1) | No | No | No | End |
| Suspend (2) | Yes | Yes | No | End |

In cases in which it is desired to resume from the snapshot taken by the breakpoint software, the current OS is terminated and started after changing hard disks. If this hard-disk changeover is done by virtual computer, it can be done by just changing file names in place of physical movement.

The following describes the procedure of resuming processing from the binary data of a snapshot that is transferred or saved.
1) The virtual disk that was being used as HDb in the VMware linux.cfg on computer system 1 (transfer source) is used as HDa in linux.cfg on computer system 11 (transfer destination). Specifically, assuming that linux.cfg on the computer system 1 has the following description
    ide0:0.fileName="./hda.dsk"
    ide0:0.fileName="./hdb.dsk"
the hdb.dsk file is transferred to computer system 11 and on the computer system 11 linux.cfg is given the following.
    ide0:0.fileName="./hdb.dsk"
2) Next, modified linux.cfg file is used to start VMware.
3) Next, a Power On operation is carried out on VMware.
4) In accordance with this operation, Linux starts, the system returns to the state at which the snapshot was taken, and processing can resume.

The above description refers to an example in which, on the computer system on the transfer side Linux is used as the host OS and Linux on VMware is used as the guest OS, and on the computer system on the side that receives the transfer, similarly, Linux is used as the host OS and Linux on VMware is used as the guest OS. However, a slight change makes it easy to resume processing using Linux as the OS on the computer system on the transfer-receiving side.

In other OSs or other virtual computers, too, substantially the same procedure as that described in the foregoing can be used to readily suspend execution of active application software and execution of the application software resumed on another computer system by transmitting the suspended state over a communication path or by transporting the state saved on a removable disk.

The Linux kernel refers to kernel process as parameters for kupdate and bdflush to write back the data in the disk cache to the hard disk. The kupdate periodically calls bdflush, and the bdflush performs the disk write-back task. With a Linux kernel 2.2 system, for example, control is by the following parameters.

age_buffer . . . Timeout value for disk write-back of ordinary data. The range is 100–60,000 tick (the default is 3000); a tick is normally $\frac{1}{100}$ second.

age_super ... Timeout value for disk write-back of i nodes, directory blocks and the like. The range is 100–60,000 tick (the default is 500).

interval ... Kupdate running interval. The range is 0–6,000 tick (the default is 500).

Ndirty ... Activates bdflush when the ratio of cache rewrites becomes this value. The range is 0–100% (the default is 40%).

In a conventional configuration, write-back of cache contents is carried out based on a comparison of the above parameter values with an elapsed time value or rewrite capacity value. In the configuration of the present invention, the MPU performs this comparison and the system is set so that write-backs are not performed when an application program or the like is being tried out. The following switch usage is used for this.

a) Method in which switch setting in snapshot is non-ROM:
The switch is switched on during the booting of the OS that used the snapshot so that state remains effective also after the resume. In this case, during the boot the boot program rewrites the switchover portion in the snapshot. This is done because when the snapshot is taken the switch is off.

b) Method in which switch setting in snapshot is ROM
When the OS snapshot is taken, the snapshot program itself is switched and embedded in the snapshot. Because this requires writing to the hard disk when taking the snapshot, this switch cannot be turned on. With respect to booting using the snapshot, this is also for when it is desired to boot with the switch remaining on.

By providing the CD-ROM implementation function on the OS side that is transferred, combined with a write-back control switch and procedure for taking a snapshot, an environment is constructed in which read-only media (or example: CD-ROM) can be tried out.

In a trial environment thus provided, if the virtual computers both emulate DOS/V computers, transfer to either computer is possible and there is no limitation to a designated virtual computer. In this case, the virtual computer only needs to be capable of emulating a real computer (DOS/V machine). If the hardware conditions are the same or the configuration allows substitutions, it is also possible to perform the transfer to a real computer.

The present invention comprised of the configuration described in the foregoing can provide the following convenience. By taking a snapshot of an active OS, the state thereof can be distributed to other computers. Also, enabling distribution of copies of applications that are running makes it possible to distribute trial evaluation versions. The party that creates the application does not have to create an installer for the evaluation version, simplifying the creation of the evaluation version. Also, the trial user can try out the distributed application without being subjected to non-recoverable damage from computer viruses.

What is claimed is:

1. An input and output means for computer system storage, comprising:
a computer equipped with a first storage, a second storage that with respect to access speed can operate at a higher speed than the first storage, and a processor; and
a virtual computer operating on said computer and equipped with a configuration that, when writing to the first storage, writes via a disk cache of a predetermined capacity and via a switch that controls whether or not data is transferred from the disk cache to the first storage according to a command from a kernel of an operating system when an issued shutdown request of the virtual computer is not classified to be normal by the kernel.

2. A software execution method using a second computer system to resume a processing from a snapshot of a processing by a predetermined application program saved by a first computer system, comprising: a step of recording snapshot data created by the first computer system onto a recording medium that is read-only or transmitting the snapshot data to the second computer system; a step of using the second computer system to read the snapshot data from the recording medium or receiving the snapshot data in the second computer system; and a step of resuming the processing by the application program in the second computer system in a state in which data transfer from a disk cache of a predetermined capacity to the first storage has stopped; wherein the second computer system comprises a computer equipped with a first storage, a second storage that with respect to access speed can operate at a higher speed than the first storage, and a processor; and a virtual computer operating on said computer and equipped with a configuration that, when writing to the first storage, writes via the disk cache and via a switch that controls whether or not data is transferred from the disk cache to the first storage according to a command from a kernel of an operating system when an issued shutdown request of the virtual computer is not classified to be normal by the kernel.

3. A software execution method using a second computer system to resume a processing from a snapshot of a processing by a predetermined application program saved by a first computer system, comprising: a step of recording snapshot data created by the first computer system onto a recording medium that is read-only; a step of using the second computer system to read the snapshot data from the recording medium; and a step of resuming the processing by the application program in the second computer system in a state in which data transfer from the disk cache of a predetermined capacity to a first storage has stopped; wherein the second computer system comprises a computer equipped with a first storage, a second storage that with respect to access speed can operate at a higher speed than the first storage, and a processor; and a virtual computer operating on said computer and equipped with a configuration that, when writing to the first storage, writes via the disk cache and via a switch that controls whether or not data is transferred from the disk cache to the first storage according to a command from a kernel of an operating system when an issued shutdown request of the virtual computer is not classified to be normal by the kernel.

* * * * *